United States Patent [19]

Prince et al.

[11] Patent Number: 5,146,355
[45] Date of Patent: Sep. 8, 1992

[54] TRANSFLECTIVE MODE LIQUID CRYSTAL DISPLAY WITH PHOSPHOR ILLUMINATION

[75] Inventors: John C. Prince, Kettleby; James F. Farrell, Pickering, both of Canada

[73] Assignee: Litton Systems Canada Limited, Etobicoke, Canada

[21] Appl. No.: 671,024

[22] Filed: Mar. 18, 1991

Related U.S. Application Data

[63] Continuation-in-part of Ser. No. 270,074, Nov. 14, 1988, Pat. No. 5,019,808, which is a continuation-in-part of Ser. No. 922,186, Oct. 23, 1986, Pat. No. 4,799,050.

[51] Int. Cl.[5] .......................................... G02F 1/1335
[52] U.S. Cl. ........................................ 359/50; 359/71; 359/68
[58] Field of Search ................ 359/50, 71, 68, 48

[56] References Cited

U.S. PATENT DOCUMENTS

| | | | |
|---|---|---|---|
| 3,840,695 | 10/1974 | Fisher | 359/50 X |
| 4,470,666 | 9/1984 | Eick | 359/50 |
| 4,678,285 | 7/1987 | Ohta et al. | 359/50 |
| 4,772,885 | 9/1988 | Uehara et al. | 340/784 |
| 4,793,691 | 12/1988 | Enomoto et al. | 359/50 |
| 4,802,743 | 2/1989 | Takao et al. | 359/68 |
| 4,822,144 | 4/1989 | Vriens | 359/71 X |
| 4,882,617 | 11/1989 | Vriens | 359/49 X |

FOREIGN PATENT DOCUMENTS

| | | | |
|---|---|---|---|
| 0168757 | 1/1986 | European Pat. Off. | 359/50 |
| 31-16022 | 5/1991 | Japan | 359/50 |

Primary Examiner—Janice A. Howell
Assistant Examiner—Ron Trice
Attorney, Agent, or Firm—Elliott N. Kramsky

[57] ABSTRACT

A transflective liquid crystal display provides a high quality color image and efficient energy utilization. A layer of liquid cyrstal material is controlled by a transparent electrode matrix. A matrix of (primary color emitting) phosphors is aligned with a matrix of transparent electrodes for controlling the shuttering of the liquid crystal layer. A source of fluorescent energy excites the phosphors. A first dichroic filter and a second dichroic filter are located behind the liquid crystal layer. The first filter reflects untraviolet light and transmits visible light while the second filter transmits ultraviolet light and reflects visible light. The two filters are arrayed so that the phosphors are efficiently energized by the ultraviolet light source while ambient illumination is utilized, the display thereby providing both transmissive and reflective modes of operation. The phosphor matrix is separated from the liquid crystal shutter layer by substantially less than the dot pitch of the phosphor matrix layer to maintain the requisite registration and minimize cross-contamination of colors.

7 Claims, 2 Drawing Sheets

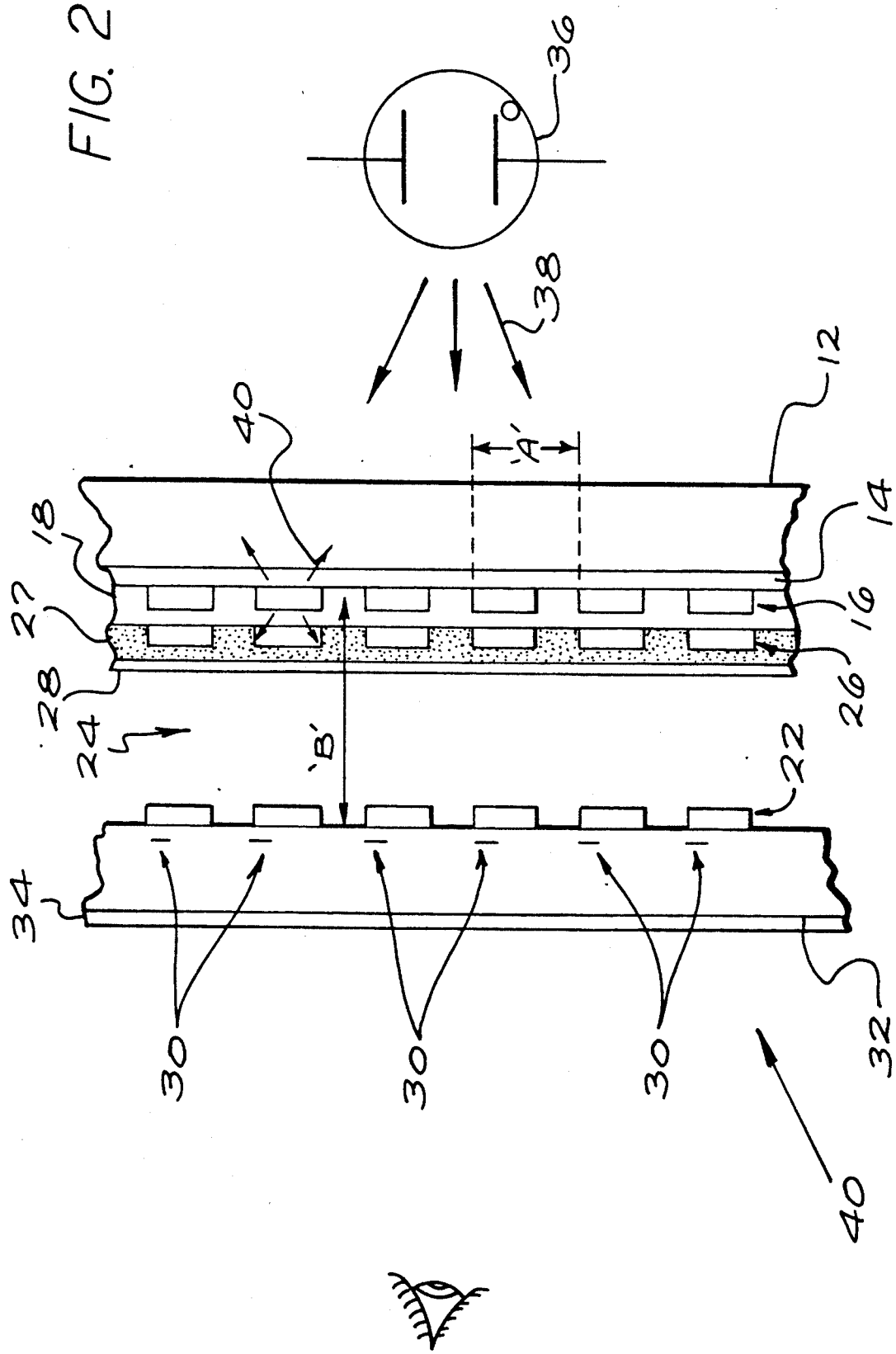

TRANSFLECTIVE MODE LIQUID CRYSTAL DISPLAY WITH PHOSPHOR ILLUMINATION

RELATED APPLICATION

The present application is a continuation-in-part of U.S. patent application Ser. No. 270,074, now U.S. Pat. No. 5,019,808, of John Colin Prince et al. entitled "Improved Full Color Liquid Crystal Display" which was filed on Nov. 14, 1988 which is a continuation-in-part of U.S. patent application Ser. No. 06/922,186, filed Oct. 23, 1986, now U.S. Pat. No. 4,799,050.

BACKGROUND

1. Field of the Invention

The present invention relates to full color displays. More particularly, this invention pertains to an improved liquid crystal display of the type that is illuminated by both ambient and artificial light.

2. Description of the Prior Art

At present, full color displays for use in aircraft and military vehicles commonly utilize a cathode ray tube (CRT). While such displays provide adequate resolution and brightness, they are relatively bulky, consume much power in operation and often require cooling systems that further contribute to the bulk and the power consumption of the total system. These factors are often of critical importance to the design of airborne systems.

The drawbacks of full color CRT displays have led to investigation of the feasibility of full color displays based, inter alia, upon the use of a layer of electro-optic liquid crystal material. Liquid crystal technology offers the possibility of flat, relatively thin and therefore highly compact construction. Further, the voltages and power levels required to actuate liquid crystal materials to a preferred orientation for modulating incident light are relatively low.

The principal classifications of liquid crystal material are twisted nematic, guest-host (or Heilmeier), phase change guest-host and double layer guest-host. The particular liquid crystal material employed dictates the type of optical modulation that is effected. For example, twisted nematic material causes the polarization of the light passing therethrough to become reoriented (usually by ninety degrees). Guest-host materials, so-called by the presence of a dye that aligns itself with the liquid crystal molecules, modulate light as a consequence of the property of the dye to absorb or transmit light in response to the orientation of the liquid crystal molecules. In phase change guest-host materials, the molecules of the liquid crystal material are arranged into a spiral form that blocks the majority of the light in the "off" state. The application of a voltage aligns the molecules and permits passage of light. Double layer guest host liquid crystal compromises two guest-host liquid crystal cells arranged back-to-back with a ninety degree molecular alignment orientation there-between.

Liquid crystal displays may be arranged to operate in a transmissive mode, a reflective mode, or both. Generally, the reflective mode is most suitable for operation under high ambient light conditions while the transmissive mode, which requires backlighting, is most usefully employed in applications involving both dark and low ambient (e.g. office) lighting conditions. The combination of both modes of operation is known as the "transflective" mode. This mode is particularly-appropriate for broad range operation that includes many important applications such as, for example, the cockpit environment.

Presently, liquid crystal displays for operation in the transflective mode include a liquid crystal light valve in combination with a source of artificial visible backlighting. A light diffusion plane is located intermediate the light source(s) and the light valve. The optical properties of the plane generally represent a compromise between the needs to (1) transmit artificial backlight and (2) reflect ambient light, when available, through the liquid crystal light valve. The state of the liquid crystal material is spatially controlled by a transparent electrode matrix. (When an active device such as a thin film transistor or "TFT" is incorporated into the array to enhance the addressability of the matrix, it is known as an active matrix display). Pixel locations are addressed and the molecules of the adjacent liquid crystal material are modulated so that a spatial distribution of pixel areas of preselected, varied light transmissions is attained. In a full color display, the spectral qualities of the backlight and/or reflected ambient light so gated by this liquid crystal matrix is further modified and separated by a discrete array of absorptive color filters having a direct spatial correspondence with the liquid crystal pixel location. Such filters normally employ the standard color primaries and are of a bandwidth to achieve some compromise between transmission efficiency and chromatic separation. By suitably modulating appropriate elements of the pixel matrix a color palette may be obtained as defined by all the above elements. A representative display of this type is disclosed in U.S. patent Ser. No. 3,840,695 of Fischer for "Liquid Crystal Image Display Panel With Integrated Addressing Circuitry."

Displays in accordance with the above-described typical arrangement are beset with many difficulties. The use of absorbing dye filters to color the image passing through the liquid crystal layer represents a highly inefficient usage of the energy of the light source. Each dedicated filter element essentially blocks transmission of two thirds of the white light through the valve. That is, in the prior art each pixel is illuminated with white light, requiring the color filters to transmit only the desired portion of the white light spectrum while absorbing all other wavelengths. In total, about one third of the energy of the white light source is transmitted through each filter "window."

The energy absorption effect is even more dramatic in regard to utilization of (reflected) ambient light by the display. Reflected light must pass through the filter twice, multiplying the energy loss. As a result, the display is often unsuitably dim. Correction for such dimness often involves an increase in the power level of the backlighting that, in turn, introduces additional undesirable effects. In addition to conflicting with the goal of a low energy display, this may produce harmful temperature rises within the system.

The design of a single filter for coloring both backlight and ambient illumination is further complicated by the different chromaticity effects experienced by the reflected light that passes twice through the filter and the transmitted light that passes through only once. Such disparity can result in a display of differing hues during high and low ambient lighting conditions.

Another deficiency of the conventional approach is that, in the desire to minimize undesirable parallax effects, the color filter elements must be closely located immediately adjacent the liquid crystal layer. Thus, the diffusion (or back) plane, which must be behind the liquid crystal layer, is recessed by the thickness of the glass layer at the rear of the liquid crystal. The resultant spacing of the filter and the somewhat-reflective backplane can produce two deleterious effects during reflective mode operation. Ambient light will generally include off-axis rays. When ambient light is absorbed in the liquid crystal layer, it creates a shadow on the diffusing plane along the axis of the incident light. Therefore, as the display is viewed at an angle with respect the direction of such incident light, the image appears to be displaced with respect to the image created in the liquid crystal layer. This results in an annoying double image or "shadowing" effect. Of perhaps even greater significance, the spacing of the backplane from the color matrix can produce cross-contamination between the primary colors of the filter. This results when an oblique, off-axis ray of ambient light passes through a filter of one primary color when incident upon the front of the light valve and then exits the valve through a filter of a second primary color after reflection from the backplane.

SUMMARY

The present invention renders a visually improved and optically efficient transflective mode liquid crystal display by the employment of novel elements and structures to circumvent the above defined deficiencies. Such a display includes a layer of liquid crystal material. A planar array of transparent control electrodes is located on one side of that layer of liquid crystal material for forming a corresponding planar array of adjacent, modulated light-conducting cells within the layer of liquid crystal material. A planar matrix layer of discrete phosphor elements of predetermined dot pitch is provided. Such layer is located on the opposed side of the layer of liquid crystal material. An ultraviolet light source is located at the opposed side of the layer of liquid crystal material and behind the planar matrix of discrete phosphor elements for irradiating those elements with ultraviolet light. The planar array of transparent control electrodes is located adjacent and in front of the layer of liquid crystal material. The spacing between the layer of discrete phosphor elements and the planar array of transparent control electrodes does not exceed one-tenth of the dot pitch.

The preceding and other advantages and features of this invention will become further apparent from the detailed description that follows. The written description is accompanied by a set of drawing figures that include numerals thereon corresponding to reference numerals of the description. Such numerals point out the various features of the invention, like numerals referring to like features of the invention throughout.

BRIEF DESCRIPTION OF THE DRAWINGS

FIG. 2 is a schematic side view of a full color liquid crystal display in accordance with this invention that serves to illustrate its operation.

DESCRIPTION

Figure 1:
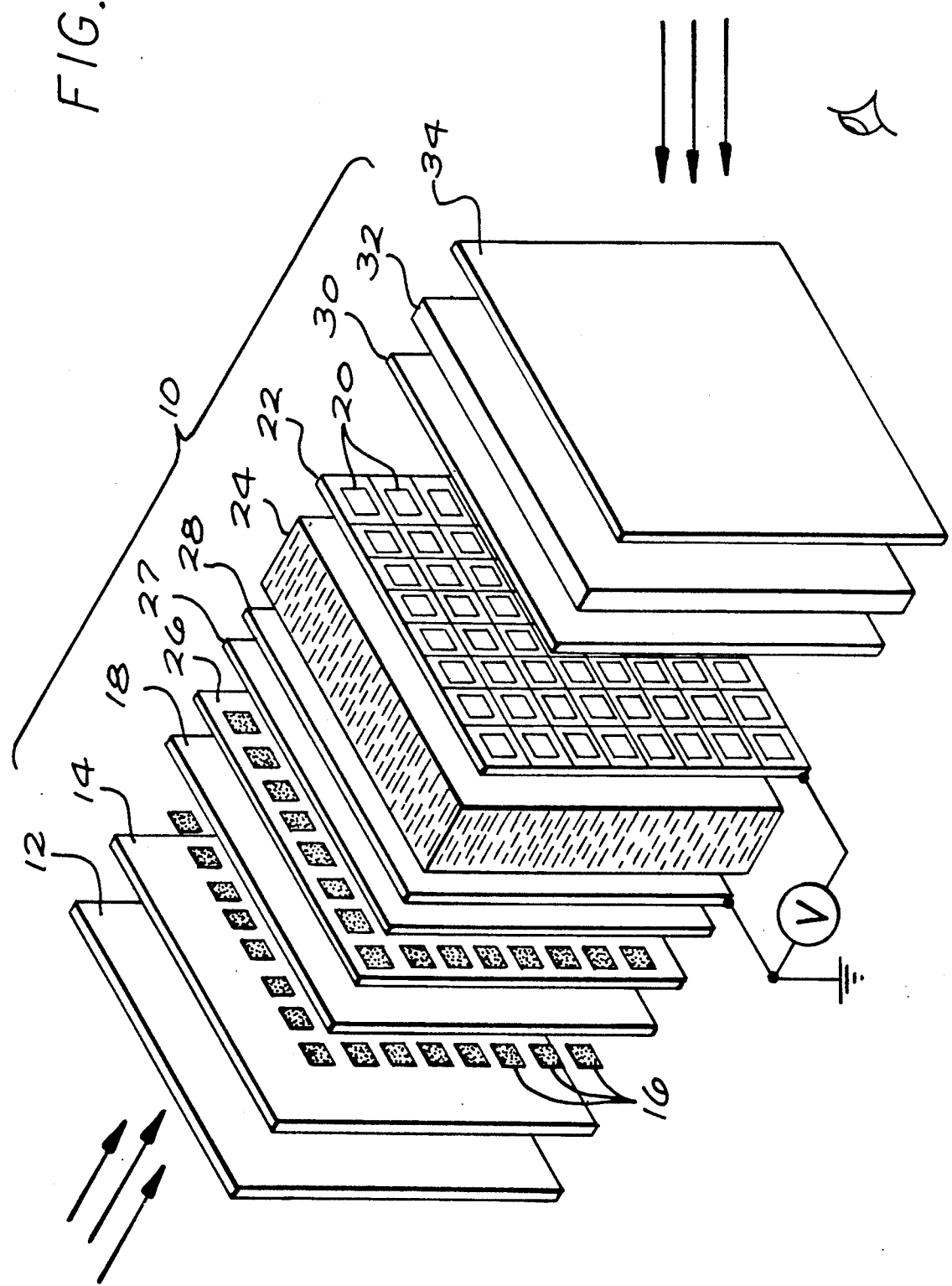
FIG. 1 is an exploded perspective view of the arrangement of a light valve for use in a full color display in accordance with the invention.

Turning now to the drawings, FIG. 1 is an exploded perspective view of the arrangement of a light valve 10 for use in a full color transflective mode display in accordance with this invention. Some of the details of construction of the light valve 10 have been omitted for purposes of clarity from the representation of FIG. 1. However, it will be appreciated by those skilled in the art that such omitted details relate to matters that are well known in the art.

The description of the structure of the light valve of FIG. 1 will proceed from its rear or backside that accepts the output from one or more sources of ultraviolet radiation to the front surface through which ambient illumination enters. A plate 12 forms the rear surface of the display 10. The plate 12, is of a material suitably transparent at the ultraviolet radiation wavelength of interest while being an acceptable substrate for liquid crystal usage. A first dichroic selective filter layer 14 may be deposited on the inner surface of the plate 12. The dichroic filter 14 is fabricated of material that is transmissive to the ultraviolet radiation wavelength of interest and reflective in the visible spectrum. (The significance of such arrangement will become further apparent from the discussion of the invention that accompanies FIG. 2).

A layer of phosphors 16 is deposited onto the plate 12 (after dichroic layer 14, if employed) A second dichroic filter 18 (shown and discussed further in conjunction with FIG. 2) may then be added on top of the layer 16, which differs from the first dichroic filter 14 in that it is fabricated of material that reflect ultraviolet and transmits visible radiation.

The layer of phosphors 16 may comprise a matrix arrangement of a plurality of discrete phosphor elements. (The term "phosphor", as used herein, includes any material that converts energy from an external excitation and, by means of the phenomenon of phosphorescence or fluorescence, converts such energy into visible light).

Each element of the layer 16 is aligned in registration with a corresponding element or thin film transistor ("TFT") 20 of an electrode matrix layer 22, that is arranged adjacent and at the distant (front) side of a liquid crystal layer 24, discussed below. The phosphor matrix may contain either a single phosphor type (i.e. one wavelength emission spectrum) or a plurality thereof to provide a multi-color display. In the case of a full color display, a plurality of phosphors, each of which emits one of the primary colors upon excitation by ultraviolet radiation, is preferably arranged into a recognized format. This may include, for example, the conventional triad, quad (in which the green component is doubled) and fixed format geometries. The phosphors may be deposited by any of a number of well known processes including settling, screen printing and photolithography, processes which are also commonly employed in CRT screen fabrication.

As an additional feature, each of the phosphors 16 may be colored (so-called "body color") such that the chromaticity of its reflectance spectrum closely matches that of its emission spectrum. The purpose of such pigmentation is to prevent the "washing out" or other introduction of color impurity into the image emitted by the excited phosphors. This can occur in the presence of high ambient illumination by the superposition of the color reflected from the surfaces of the phosphors.

An optional color filter 26 may be arranged adjacent the layer of phosphors 16 (and the dichroic filter 18.) The filter 26, comprising a matrix of light absorbing dyes (each in registration with a like-colored phosphor 16), the heights of individual filter elements differing according to coloration, provides an alternative to body coloring the phosphors to prevent image washout in high ambient illumination. While the arrangement of dye elements, and the principle of operation of the filter 26 are the same as that of a color filter of the type commonly employed on prior art liquid crystal displays, the filter 26 is qualitatively different inasmuch as its sectral bandpass and optical density are specifically optimized to achieve a chromatic approximation in the reflective mode of operation to that obtained during the dominating back-lit (ultraviolet excitation) configuration.

The emissions of colored light from the phosphors 16, when excited, generally possess narrow bandwidths and exhibit well-saturated chromaticities that are similar in performance to the outputs from the cathode luminescent phosphors of color CRT's. The phosphor outputs are necessarily superimposed upon the corresponding color filter elements when illuminated by reflected ambient light. Therefore, the filter 26 needn't have the same selectivity as the light absorbing filters of prior art liquid crystal displays. Thus, in addition to lesser wavelength selectivity, the filter 26 features a much wider passband and may be employed with a correspondingly reduced effect in terms of its absorption of the energy input (both natural and artificial) to the display. A much higher percentage of white light is transmitted through the absorbing filter 26 of the display of the invention than is transmitted through the more wavelength-selective filter commonly employed in prior art liquid crystal displays. The increased transmissivity of the filter 26 provides an even more pronounced effect in the reflective mode of operation as reflected ambient light passes through the filter 26 twice (upon both incidence and reflection).

After placement of layers 14 (optional) 16, 18 (optional) and 26 (optional) upon the plate 12, the resultant surface texture may be incompatible with the subsequent construction of a functional liquid crystal cell. A planarizing layer 27 of optically transmissive material is added to provide the requisite smoothness for cell construction. (Since the layer 24 of liquid crystal material is approximately 5 μm thick, any undulations must be much smaller than 5 μm. As noted, infra, the phosphors 16 alone can introduce uneveness of 2 μm.) The layer 27 must be of suitable chemical composition, either organic (e.g., polyimide) or inorganic (e.g., silicodioxide.) It may be deposited by one of a number of well-known processes such as screening, meniscus coating, bias sputtering or the like.

A layer of transparent conductive material such as ITO (indium tin oxide) 28 is located between the filter 26 and the liquid crystal layer 24. The layer 28 is maintained at a reference potential and serves as the common or counterelectrode of the display. As will be appreciated by those skilled in the art, a further layer of material (not shown) may be applied to both provide electrical insulation and permit suitable molecular alignment of the liquid crystal material.

The layer 24, which comprises liquid crystal material (between 0.1 and 0.5 mil in thickness) sandwiched between two transparent plates (each about 10 to 50 mils in thickness), is preferably formed of guest-host (Heilmeier) liquid crystal material as such material is known to have a good gray-level characteristic (i.e. linearity of the voltage-light transmission relationship). However, phase change guest-host material or other electro-optic modulation material not dependent upon the existence of a polarization selection element at the rear surface of the cell is equally compatible with the geometry of the invention. The general arrangement of the invention is further compatible with the additional structural layers required to accommodate double layer guest-host liquid crystal material.

The active electrode matrix 22, comprising metallized buses and transparent TFT's 20 is formed on an absorptive bus mask 30 that is, in turn, fixed to the inner surface of a front plate 32. The bus mask 30 comprises a black layer fabricated of a mixture of metal oxides such as chromium and may include oxides of manganese or magnesium. It is applied to the glass front plate 32 prior to formation of the electrode matrix 22. The mask 30 acts to "hide" the otherwise-very reflective metallic buses of the matrix. The arrangement and fabrication of such an electrode matrix for spatially distributing a plurality of liquid crystal level voltages is well known in the art and is disclosed, for example, in the Fischer patent referenced above. Generally, such a structure may be formed by vacuum deposition of metallized electrodes (dielectric inter-layers are provided for necessary insulation). The electrode matrix 22 is preferably an "active" matrix that associates a semiconductor device (transistor or diode) with each node of the bus structure. Such active electrode arrays facilitate the addressing of large element arrays.

The present device realizes a significant advantage in terms of lower material and fabrication costs and substantial elimination of the thermal incompatibility problems that are inherent in transflective displays of the type that utilize a fiber optic plate as a relay lens for transferring the emission of a phosphor matrix to the surface of a liquid crystal shutter layer to thereby overcome undesirable image dispersion that can result in color contamination and related problems. In the present invention the image dispersion problem is addressed, without a fiber optic relay element, by locating the layer of phosphors 16 sufficiently close to the liquid crystal layer 24 so that the dispersion of light emitted from the phosphors 16 will have a negligible and imperceptible effect, if any, upon the quality of the image provided by the display. This is accomplished by placing both the matrix of phosphors 16 and the optional color filter 26 on the same side of the layer of liquid crystal material 24.

The final element of the light valve 10 is an optional polarizer 34. This is required for operation of the display when a guest-host (Heilmeier) type material is employed for the liquid crystal layer 24 but would be unnecessary in a display that utilizes materials not dependent upon polarization state.

FIG. 2 is a partial side view of the transflective liquid crystal display of the invention with certain elements omitted to assist in the accompanying discussion. As indicated, the phosphors 16 of the matrix are separated, center-to-center by a distance "A" that defines the dot pitch. In a 'direct view' video resolution embodiment of the invention a dot pitch of approximately 150 μm would be appropriate for the phosphors 16.

As stated previously, for the display to obtain good color performance the emitting phosphors (and optional dichroic filter 14) must be in close proximity to the liquid crystal material 24 and the active electrode matrix 22, relative to the phosphor matrix pitch. While the precise ratios of such spacings are dictated by specific cell geometries, the spacing between the emitting phosphors 16 and the electrode matrix 22 should be no greater than one-tenth of the phospor matrix pitch. For the 'direct view' example cited this equates to 15 μm which is easily achievable with the embodiment described.

A lamp 36 whose output comprises ultraviolet radiation 38 rather than visible light is positioned at the backplane of the display. The lamp's electrodes are enclosed within a clear envelope of quartz or other ultraviolet-transmissive material. As will become apparent from the discussion that follows, the lamp 36 excites the phosphors 16 to emit visible light. In general, the lamp's dominant emission spectrum is between 254 nm and 365 nm, selected to match the excitation spectra of the phosphors 16. Other energy sources, including electron beams, are known to excite phosphors to emit visible light and may be substituted for the lamp 36.

The invention takes advantage of the intrinsically high energy conversion efficiency (visible light emitted per unit of energy applied) of fluorescent illumination. Whereas an incandescent lamp exhibits an overall efficiency of approximately 15 lumens per watt, the efficiency of fluorescent illumination exceeds 50 lumens per watt. Unlike prior art systems that utilize a fluorescent lamp as a source of visible white light that is thereafter colored by means of lossy filters, the present invention obtains the advantage of the energy efficiency offered by fluorescent energy utilization.

Ultraviolet radiation 38 from the lamp 36 is transmitted through the first dichroic filter 14 prior to reaching the phosphors 16. As the radiation 38 reaches and energizes the phosphors 16, it is, in turn, converted to colored visible light at a relatively high efficiency (in excess of eighty percent). This contrasts with prior art systems that rely upon lossy color filters that are limited in transmission to about thirty percent of the incident energy.

The ultraviolet radiation 38 that is not initially absorbed by the matrix of phosphors 16 may be reflected from the second dichroic filter 18 if required and, upon reflection therefrom, may be absorbed by the phosphors, further increasing the energy conversion efficiency of the system. The size and spacing of the phosphors 16 will effect the efficiency of energy conversion. This, of course, is related to the distance "B" which is, in turn, a function of the dot pitch of the matrix of phosphors 16.

The visible colored light 40 emitted by the phosphors 16 is radiated toward the front and the back of the display. Due to the (visible light) reflectivity of the first dichroic filter 14, phosphor emissions directed toward the backside are reflected therefrom and toward the front of the display. The matrix of phosphors is formed adjacent to the dichroic filter 14. Only minimal "spreading" of the reflected phosphor outputs can occur since the phosphors are generally limited to 2 μm in height. Thus, a high percentage of this reflected light is available for illumination of the display.

The first dichroic filter 14 additionally reflects the incoming ambient light that enters the front side of the display. The portion of ambient light reaching the filter 14 represents the residue of the incoming light that is incident upon the diffusing surfaces of the phosphors 16. As mentioned earlier, the effect of that light insofar as reducing the purity of the backlit image produced by the display is corrected either by coloring the phosphor bodies to match their emission spectra or the addition of the optional dilute color filter 26 at the rear of the liquid crystal layer 24.

In the event that the phosphors 16 are not colored and an optional filter matrix 26 is employed, dispersion of off-axis incident illumination 40 is minimized by the very close spacing (between about 2 μm and 5 μm) of the phosphors 16 to the liquid crystal layer 24. This prevents cross-contamination of colors and assures that the ambient illumination 40 enhances image color quality. As mentioned above, the colored windows of the filter 26 are aligned with the matching color-emitting phosphors 16. By locating the filter 26 intermediate the closely spaced phosphor 16 and liquid crystal 24 layers, the ambient light that is incident upon the phosphors 16 is required to travel and exit through the particular window of the color filter 26 that is in registration with the phosphors 16 of identical color. The particular light path for a given phosphor-filter combination is, of course, shuttered (for "off", "on" and "gray-level" light transmission) by the alignment of the molecules of the liquid crystal layer 24. Thus, ambient light is reflected only off the phosphors that have been shuttered "on" by the liquid crystal layer 24.

Thus it is seen that there has been provided a new liquid crystal display of the type that is illuminated by both ambient and artificial light energy. As such, the display is operable in the transflective mode. Although reference has been made to liquid crystal light valve material, it should be understood that other known types of light valves or modulators may be adapted to the present invention. Examples of such alternatives include suspensions of polarizing particles in a host of liquid, magneto-optical light modulators that utilize the Faraday effect and piezoelectric light modulators.

By utilizing a display in accordance with the teachings of the invention, one can realize much higher efficiencies in the utilization of input energy. This beneficial result derives, in part, from a combination of the generally low power requirements for modulating liquid crystal material (as opposed to CRT technology) coupled with a design that features the efficient energy transformations that are inherent in the use of ultraviolet radiation to excite phosphorescent material to narrow band emissions of visible light. Furthermore, unlike displays that utilize a fiber optic plate relay lens for registration of display elements, the present invention is economical and easy to manufacture and operate.

While this invention has been described with respect to its presently preferred embodiment, its scope is not so limited. Rather, the scope of this invention is only limited insofar as defined in the following set of claims and includes all equivalents thereof.

What is claimed is:

1. A transflective mode liquid crystal display comprising in combination:
   (a) a layer of liquid crystal material;
   (b) an active planar array of transparent control electrodes on a first side of said layer of liquid crystal material for forming a corresponding array of adjacent, modulated light-conducting cells within said layer of liquid crystal material;
   (c) a planar matrix layer of discrete phosphor elements of predetermined dot pitch, said layer being located on the opposed, second side of said layer of liquid crystal material;
   (d) an ultraviolet light source located behind said second side of said layer of liquid crystal material and behind said planar matrix of discrete phosphor elements for irradiating said phosphor elements with ultraviolet light;

(e) a dilute color filter comprising a planar matrix of light-absorbing, wide-passband dye elements, each of said dye elements being in alignment with a like color emitting one of said phosphor elements located between said phosphor layer and said layer of liquid crystal material and adjacent a transparent counterelectrode; and (f) the spacing between said layer of discrete phosphor elements and said planar array of transparent control electrodes does not exceed one-tenth of said dot pitch.

2. A display as defined in claim 1 wherein said planar array of transparent control electrodes is formed upon an absorptive bus mask.

3. A display as defined in claim 2 further including:
(a) a first dichroic filter behind said planar matrix of discrete phosphor elements and in front of said ultraviolet light source for transmitting ultraviolet light to said phosphor layer and for reflecting incident visible ambient light;
(b) a second dichroic filter means in front of said planar matrix for transmitting visible ambient light to said matrix and for reflecting incident ultraviolet light incident thereupon; and
(c) a planarizing layer on the front of said phosphor matrix.

4. A display as defined in claim 3 wherein said planarizing layer is fabricated of silica-dioxide.

5. A display as defined in claim 3 wherein said planarizing layer is fabricated of polyimide.

6. A display as defined in claim 3 further including a transparent counterelectrode layer located adjacent said second side of said layer of liquid crystal material.

7. A display as defined in claim 6 further characterized in that said transparent counterelectrode layer is located between said phosphor layer and said layer of liquid crystal material.

* * * * *